Sept. 22, 1942.   H. V. INSKEEP ET AL   2,296,387
APPARATUS FOR HEAT TREATING
Filed April 13, 1940
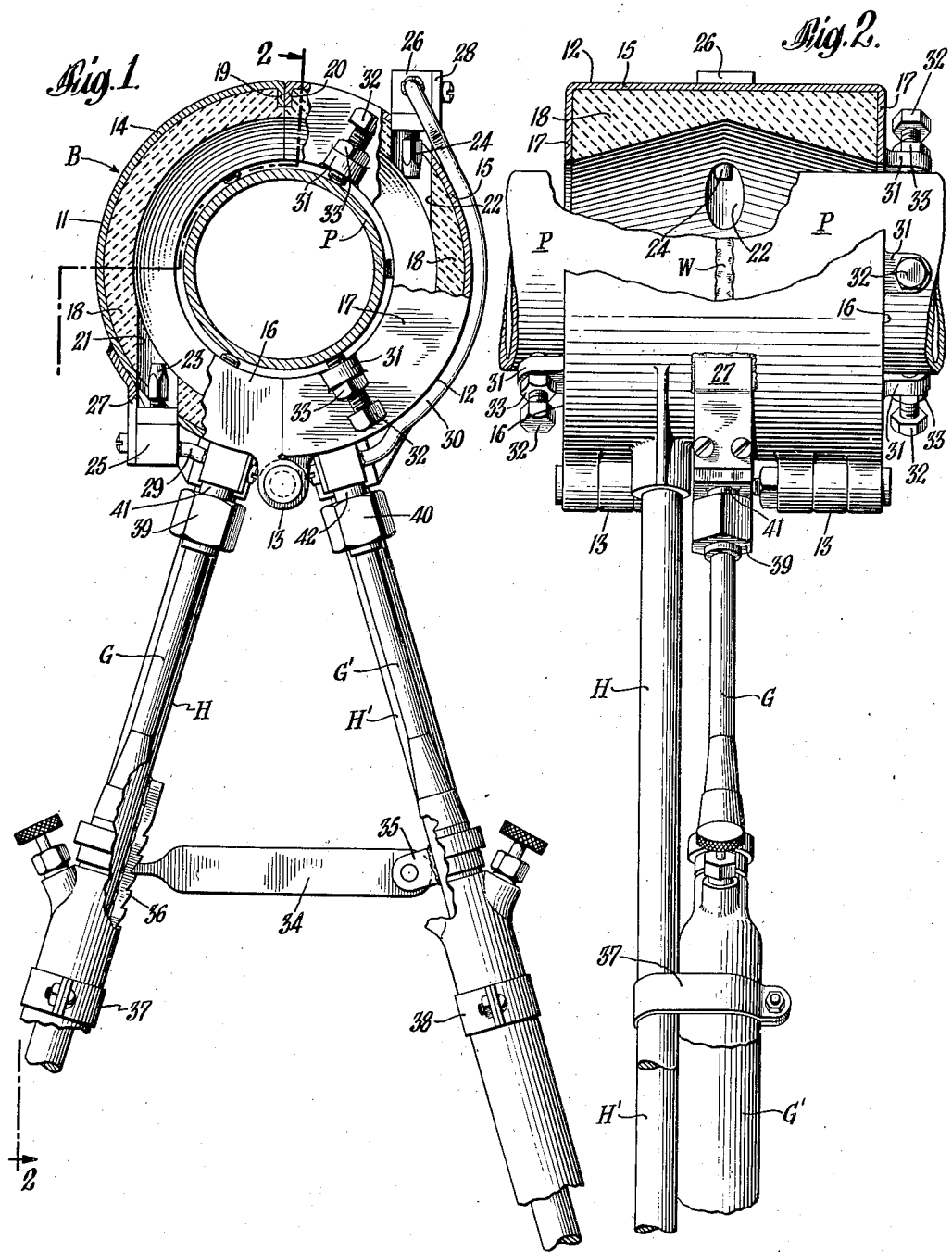
INVENTORS
HARRY V. INSKEEP
GEORGE W. PATCH, JR.
BY
ATTORNEY Patented Sept. 22, 1942

2,296,387

UNITED STATES PATENT OFFICE 2,296,387

APPARATUS FOR HEAT TREATING

Harry V. Inskeep, Fanwood, N. J., and George W. Patch, Jr., Kenmore, N. Y., assignors, by mesne assignments, to Union Carbide and Carbon Corporation, a corporation of New York Application April 13, 1940, Serial No. 329,408

6 Claims. (Cl. 266—5)

This invention relates to apparatus for heat treating circumferential welds in pipes and the like, and the adjoining base metal which may have been affected adversely by the welding operation.

When lengths of steel pipe are joined by gas or electric welding, the heat of the welding operation and the subsequent rapid cooling of the metal sometimes cause internal stresses to be set up locally in the weld and adjoining portions of base metal, as well as producing excessive hardness and the formation of an undesirable grain structure. Steels having a medium or high carbon content, and alloy steels are particularly subject to these undesirable effects. Such a welded joint will be weak and brittle and generally unsatisfactory for service unless suitable steps are taken to relieve the internal stresses and reduce the excessive hardness, and in some cases even to refine the grain structure of the weld metal and adjacent portions of the pipe.

The physical properties of the weld and adjoining base metal may be improved considerably by heating to a temperature of about 650° C., maintaining the pipe and weld at this temperature for a predetermined soaking time, and thereafter slowly cooling from the soaking temperature. Such an annealing heat treatment will relieve the locked-up internal stresses and reduce the hardness of the weld and adjacent metal so that the pipe will be in a suitable condition for conveying fluids or similar service wherein the pipe is not subject to heavy mechanical loading. If the welded joint is to be subjected to heavy mechanical loading, the grain-structure may be refined by heating the weld metal and adjoining base metal to a temperature above the critical point of the steel, such as 900° C. for example, soaking at this temperature for a suitable interval of time, and thereafter slowly cooling the heated metal through the critical point to a low temperature, thus producing a stress-relieved high strength ductile joint having a normalized grain structure.

Of course, heat treatment of welded pipe may be carried out in a large heat-treating furnace wherein the whole pipe may be heat treated to produce the proper physical properties. Obviously, however, heat treatment in such a furnace cannot be applied in the field for heat treating welds in oil pipe lines, power plant piping, oil well casing, and similar structures, because the pipe in such applications is welded in its permanent position. Furthermore, such heat treatment is uneconomical because the whole article must be heated, rather than just the adversely affected zones. Efforts have been made to devise suitable methods and apparatus for locally heat treating welds in position so as to eliminate the undesirable effects mentioned above but, prior to the present invention, such apparatus has been complicated in construction and difficult to position over the portion of the article to be heat treated. Additionally, satisfactory and uniform results have not been obtainable because of the impossibilty of heating the weld and adversely affected adjoining base metal to the necessary uniform temperature throughout; and because of the difficulty of accurately controlling the temperature during the soaking period and the subsequent slow cooling period.

The principal object of the present invention is to provide novel apparatus for the localized heat treatment of circumferential pipe welds, overcoming the above-mentioned disadvantages of the prior art. Other objects are the provision of such apparatus which may be easily and quickly manipulated by the operator, even in confined spaces; which may be supported by the pipe itself in properly spaced relation thereto; which embodies a novel arrangement for the supply and distribution of the fluid fuel; which is simple yet sturdy in construction, and economical both to manufacture and to use; and which is designed for portability to permit the heat treatment of pipe welds after installation of the pipe in its permanent location.

The above and other objects and the novel features of the invention will become apparent from the following description, taken in connection with the accompanying drawing, in which:

Fig. 1 is an end elevational view, partly broken away and in section, showing one embodiment of the apparatus of the invention; and Fig. 2 is a side view, partly broken away and in section, taken along the line 2—2 of Fig. 1.

Generally, the method of locally heat treating an article having a weld, with the apparatus of the present invention, comprises introducing adjacent to the zone of metal to be treated a heating medium, such as an oxy-acetylene flame or flames, and confining the major portion of the heat from the heating medium to the weld and local adjoining portions of base metal, which have been adversely affected by the welding operation, within a refractory lined chamber which extends continuously lengthwise of the weld. The shape of the chamber is such that the heat is gradually confined more closely to the surface of the article as the distance increases transversely of the weld from the zone of greatest heat intensity, which is adjacent to the point or points of introduction of the heating medium. The enclosed weld and adjoining base metal thus are heated uniformly to a predetermined temperature, are soaked at that temperature for an interval of time, and then are slowly cooled by gradually reducing the heat input so that all residual stresses are relieved and the hardness of the metal is decreased. Uniform heating of the weld and adjoining base metal also is obtained by directing the primary heating flames against the refractory lining of the confining chamber so that only the reflected secondary flames impinge against the article. As shown in Figs. 1 and 2, the preferred embodiment of the apparatus of the invention for locally heat treating circumferentially welded pipe comprises a ring-shaped body B comprising two halves 11 and 12 which mutually abut along a plane and are hinged together on one side as at 13 so as to open for the reception of a pipe P having a circumferential weld W, and to permit the closing of the two halves over the pipe. The body B comprises two semi-cylindrical steel shells 14 and 15 having side flanges 16 and 17 turned inwardly toward the pipe P, which provide channels within which is secured a suitable refractory material 18, such as magnesite for example. Inwardly turned lips 19 and 20 at the ends of the respective halves assist in confining the refractory material, which extends over the edges of the lips to provide a practically continuous refractory surface when the two halves are in abutting relationship. The refractory lining is so shaped that the inner circumferential surface of the body B, when the two halves 11 and 12 are in abutting relationship, forms a continuous annular channel which is adapted to bridge a weld. The refractory surface then is spaced at its sides or edges close to the pipe to be heat treated on each side of the weld, and increases gradually in distance from the pipe as the distance from the sides toward the center line of the inner circumferential surface increases.

Diametrically opposite substantially parallel ports 21 and 22 extend through the shells 14 and 15, respectively, and the refractory lining 18 intermediate the sides of and approximately upon the center line of the inner circumferential surface of the body B. Nozzles 23 and 24 for the injection of fluid fuel extend into the respective ports 21 and 22 from nozzle blocks 25 and 26, which are held in position by brackets 27 and 28 welded to the shells 14 and 15 respectively. Tubes or distributing conduits 29 and 30, respectively, connect the gas supply members G and G' with the fuel-introducing nozzles 23 to 24, respectively, to supply a combustible gas mixture to the nozzles. The ports 21 and 22 are so formed, and the nozzles 23 and 24 are so arranged therein, that primary flames from the nozzles will be directed into the annular space formed between the inner circumferential surface of the body B and the pipe P in opposite directions substantially tangentially to the pipe P to be heat treated, and will impinge against and be reflected from the inner surface of the refractory lining 18. Only the reflected secondary flames then will impinge directly against the pipe.

A plurality of spaced-apart lugs 31 are secured to the side flanges 16 and 17 on each side of the body B, the lugs on each side being arranged in staggered relation to the lugs on the other side. Within each lug 31 is threaded a suitable set screw 32 extending inwardly of the body B and bearing a lock-nut 33. The set screws 32 may be adjusted to bear against the pipe P to position and support the body B in properly spaced stationary relationship thereto with its edges spaced slightly from the pipe so that the exhaust gases from the flames may escape under the sides of the body without materially reducing the heating effect on the pipe.

In order to facilitate the opening of the body B to receive a pipe, suitable outstanding handles H and H' are secured to the halves 11 and 12 on the same side as the hinges 13 for manipulating the two halves. Positioning of the apparatus to encircle a pipe may be accomplished simply by moving the two handles toward one another to open the body, placing the two halves over the pipe, and then moving the two handles away from one another until the ends of the half-sections meet on the opposite side of the body from the handles. After the apparatus has been positioned around a pipe to be heat treated, the two halves may be securely locked together by means of a lock-bar 34, one end of which is pivoted within a lug 35 on the handle H', and the other end of which is adapted to latch with a saw-toothed rack 36 secured to the other handle H.

The gas supply members G and G' illustrated are conventional oxy-acetylene blowpipe bodies for mixing oxygen and acetylene to provide a combustible gas mixture. The members G and G' are removably secured to the handles H and H' by straps 37 and 38, and to the body B by suitable coupling nuts 39 and 40 engaging inlet nipples 41 and 42 which are brazed or otherwise secured to the respective halves 11 and 12.

When heat treating a circumferentially welded pipe or the like with the apparatus described above, uniform heating of the whole weld and the adjoining metal results from the shape of the refractory lining and the manner of introduction of the flames. As only the reflected secondary flames strike the pipe directly, the heat is distributed evenly to and around the pipe within the annular channel, and spotty localized overheating is prevented.

The temperature of the refractory lining decreases gradually as the distance transversely of the weld from the points of flame introduction increases, with a resultant decrease in the quantity of heat radiated from the lining, thus tending to produce a temperature gradient in the pipe. This tendency is offset, and uniform heating is obtained, by the previously described shape of the refractory lining whereby the heat is confined gradually more closely to the pipe as the distance transversely of the weld from the flames increases. In actual practice, the portions of the pipe within and immediately adjacent to the edges of the confining body B are maintained at a slightly lower temperature than the weld and portions of pipe adjacent to the weld, because the relatively cold pipe outside of the body B conducts heat rapidly away from the heated portion. Preferably, therefore, the body B is made of such width as to confine not only the actual weld and adjoining portions of pipe which have been adversely affected by the welding operation, but also to confine a small portion of pipe beyond the end of each adversely affected zone. Thus, uniform heat treatment of the weld and adjacent adversely affected zones is insured.

The rates of heat input to the heat treating apparatus of the invention during the heating and cooling periods may be controlled by means of accurate gas controlling regulators (not shown), whereby the quantities of fuel and oxygen supplied may be regulated within very close limits to produce the desired heat intensity of the flames.

What is claimed is:

1. In apparatus for heat treating pipe or the like having a circumferential weld, an annular body comprising refractory material adapted to be positioned around such pipe, the inner circumferential surface of said body being substantially continuous and having the conformation of an annular channel, the edges of said surface being adapted to be spaced close to such pipe on each side of such weld, and said surface adjacent to the center line thereof being adapted to be spaced from such pipe by a substantially greater distance than said edges, said body being formed in two mutually abutting halves; nozzle means arranged to direct heating flames into said channel approximately on the center line thereof and directed initially against the surface of said channel; hinge means on one side of said body securing said halves together; and means comprising two outstanding handles secured one to each half of said body on the same side of said body as, and immediately adjacent, said hinge means for manipulating said halves.

2. Apparatus for heating pipe or the like having a circumferential weld, said apparatus including an annular heat confining body adapted to be arranged around a pipe or the like to provide an annular chamber, said body having an inner circumferential surface comprising refractory material, and said body being formed of two mutually abutting halves; means on one side of said body hinging said halves together; means comprising two outstanding handles secured one to each half of said body on the same side of said body as said last-named means and immediately adjacent thereto for manipulating said halves; and means for introducing heat adjacent to the inner circumferential surface of said body.

3. Apparatus as claimed in claim 2, also including means carried by said handles for maintaining said halves in mutually abutting relation.

4. A portable device for locally heating pipe or the like, including an annular heat confining body adapted to be arranged around a pipe or the like in spaced relation thereto, said body comprising two mutually abutting halves hinged together; means for latching said halves in mutually abutting relation; and adjustable spacing and supporting means carried by said halves and extending inwardly from said body for engagement with the surface of a pipe or the like.

5. A portable device for locally heating pipe or the like, including an annular heat confining body adapted to encircle a pipe or the like in spaced relation thereto, said body comprising two mutually abutting semi-cylindrical halves hinged together; means associated with each of said halves for introducing a fluid fuel into the space between said body and such pipe or the like; two handles operatively engaged one to each of said halves and projecting therefrom for manipulating said body with respect to such pipe or the like; supply members for fluid fuel carried one by each of said handles and terminating close to the respective halves; and distributing conduits for fluid fuel associated with said halves and connecting the respective supply members with the respective fuel introducing means.

6. A portable device for locally heating pipe or the like, including an annular heat confining body adapted to encircle a pipe or the like in spaced relation thereto, said body comprising two mutually abutting semi-cylindrical halves; hinge means adjacent to one side of said body hinging said halves together for opening and closing movement; means associated with each of said halves for introducing a fluid fuel into the space between said body and such pipe or the like; two handles operatively engaged one to each of said halves and projecting therefrom adjacent to said hinge means for manipulating and positioning said body with respect to such pipe or the like; supply members for fluid fuel carried one by each of said handles and terminating close to the respective halves; and distributing conduits for fluid fuel associated with said halves and connecting the respective supply members with the respective fuel introducing means.

HARRY V. INSKEEP.
GEORGE W. PATCH, Jr.